US006103851A

United States Patent [19]
Roser et al.

[11] Patent Number: 6,103,851
[45] Date of Patent: Aug. 15, 2000

[54] HIGH SERVICE TEMPERATURE POLYURETHANE COMPOSITIONS

[75] Inventors: Jean-Luc Roser, St. Julien en Genevois, France; Rajinder L. Sood, Trelex; Antonio Storione, Chatelaine, both of Switzerland

[73] Assignee: The Dow Chemical Company, Midland, Mich.

[21] Appl. No.: 09/156,860

[22] Filed: Sep. 18, 1998

Related U.S. Application Data

[60] Provisional application No. 60/059,948, Sep. 26, 1997.

[51] Int. Cl.$^7$ .................................................. C08G 18/10
[52] U.S. Cl. .............................. 528/77; 528/65; 264/241; 527/302
[58] Field of Search ........................ 528/77, 65; 264/241; 527/302

[56] References Cited

U.S. PATENT DOCUMENTS

| | | | |
|---|---|---|---|
| 3,433,751 | 3/1969 | Kobe et al. | 260/2.5 |
| 3,505,255 | 4/1970 | Granger et al. | 260/9 |
| 3,577,385 | 5/1971 | Feltzin et al. | 260/47 |
| 3,689,442 | 9/1972 | Taub | 260/9 |
| 4,094,828 | 6/1978 | Klein | 260/2.5 |
| 4,242,490 | 12/1980 | Emerson et al. | 528/77 |
| 4,247,654 | 1/1981 | Wagner | 521/158 |
| 4,430,490 | 2/1984 | Doerge | 528/77 |
| 4,522,969 | 6/1985 | O'Connor et al. | 524/425 |
| 4,767,796 | 8/1988 | Cortelek et al. | 521/61 |
| 4,782,099 | 11/1988 | Dietrich et al. | 521/175 |
| 4,927,861 | 5/1990 | Souto et al. | 521/99 |
| 5,045,623 | 9/1991 | Horn et al. | 528/60 |
| 5,175,195 | 12/1992 | Tani et al. | 521/159 |
| 5,229,427 | 7/1993 | Madaj | 521/107 |
| 5,338,800 | 8/1994 | Umetani et al. | 525/126 |
| 5,521,226 | 5/1996 | Bleys | 521/174 |
| 5,552,450 | 9/1996 | Hinz et al. | 521/174 |
| 5,556,925 | 9/1996 | Kousaka et al. | 525/440 |
| 5,571,453 | 11/1996 | Barry et al. | 521/174 |
| 5,596,059 | 1/1997 | Hager et al. | 527/300 |

FOREIGN PATENT DOCUMENTS

| | | | |
|---|---|---|---|
| 380088 | 1/1990 | European Pat. Off. | C09K 3/10 |
| 317040B1 | 2/1994 | European Pat. Off. | |
| 4236562 | 5/1994 | Germany | C08G 18/10 |

OTHER PUBLICATIONS

91–354690/49, DD291671–A, "Thixotropic 2–component polyurethane adhesives—comprises poly:ol component and isocyanate component, both contg. Rheologically–effective polyurea modified additives", Nov., 1991.

84–241261/39, Derwent, J59145129A, "Reaction injection moulding resin compsn.—contg. Poly:ol, chain propagation agent and poly:isocyanate", Aug., 1984.

86–242457/37, J61171720–A, "Self releasing polyurethane esp. For RIM—by polymerizing organic poly:isocyanate high mol. Wt. polyoxyalkylene poly:ol and active hydrogen contg. Poly:amine", Feb., 1986.

96–106538/12, DE4428048–A1, "Prodn. Of quartz sand polyurethane molding without solvent or catalyst", Feb., 1996.

95–037182/06, DE4321204–A1, Derwent, "Polyether–ols for rigid polyurethane foam prodn.—comprises propoxylated sucrose–glycerol mixts. Contg. Secondary hydroxyl gps." Jan., 1995.

89–256716/36, DE3805–106–A, "High temp.–resistant low–density polyurethane foam—obtd. By reaction of isocyanate with sugar–based polyether–polyol, cyanamid, catalyst, blowing agent, stabilizer etc." Aug., 1989.

37213 D/21, J56034–721, "Hard polyurethane compsn. Of di:isocyanate and poly:hydric alcohol—prepaid. From ethylene or propylene oxide and biphenol/A" Jul., 1981.

C. G. Potts, et al., "Developments In Rigid Polyurethane Foams For the Insulation Of District Heating Pipelines", 1984, Technomic Pub., Polyurethanes World Congress.

K. L. Frisch, et al. "New Heat Resistant Isocyanate Based Foams for Structural Applications", Sep. 24–26, 1991, pp. 850–851, Technomic Pub., Polyurethanes World Congress 1991.

J. J. Cimerol et al., "PUR–foam formulas that stand up to heat", Aug., 1982, pp. 45–47, Modern Plastics International.

K. C. Frisch, et al., "Novel Heat–Resistant Isocyanate–Based Polymers", Sep. 30–Oct. 03, 1990, pp. 515,. 33$^{rd}$Annual Polyurethane Technical/Marketing Conference.

Y. Maeda, et al., "High Performance Thermoplastic Polyurethane Elastomer", Oct. 01–Apr., 1989, pp. 112–117, 32$^{nd}$ Annual Polyurethane Technical/Marketing Conference.

"Roller Coaster Wheels Get a Longer Lease on Life", Dupont Specialty Chemicals, Mar., 1996.

(List continued on next page.)

*Primary Examiner*—Rachel Gorr
*Attorney, Agent, or Firm*—Norman L Sims

[57] ABSTRACT

The invention is polyurethane compositions useful in high temperature service environments comprising A) i) one or more polyols having hydroxyl functionality of 3.0 or greater and a weight average molecular weight of about 2000 to about 6000 wherein the polyols are the reaction product of an initiator or mixture of initiators having an average functionality of 4 or greater and one or more alkylene oxides; or ii) a) one or more polyols having hydroxyl functionality of 3.0 or greater and weight average molecular weight of greater than about 4000 wherein the polyols are the reaction product of an initiator or mixture of initiators having an average functionality of 4 or greater and one or more alkylene oxides, and b) one or more crosslinkers having an equivalent weight of about 200 or less;

B) an organic isocyanate; and

C) a catalyst for the reaction of an isocyanate with an active hydrogen containing compound; wherein the ratio of isocyanate moieties to active hydrogen containing moieties is from about 0.9:1.0 to about 1.5:1.0.

The compositions of the invention can be processed at relatively low temperatures to form high heat service temperature compositions useful as adhesives, sealants, encapsulants, gaskets or elastomers.

20 Claims, 5 Drawing Sheets

OTHER PUBLICATIONS

S. Z. Dai et al., "High Temperature Stable Rim Polyurea Polymers for Automotive Body Panel Applications", p. 225, 1996, Polyurethanes Expo '96.

T. L. Plummer, et al., *"Para–Phenylenediisocyanate (PPDI) Based Thermoplastic Polyurethanes Provide High Thermal Stability and Excellent Power Loss Properties"*, pp. 549–555, 1996, Polyurethanes Expo '96.

R. L. Mascioli, *"Urethane Applications for Novel High Molecular Weight Polyols"*, pp. 139–142, Oct. 1,–Apr., 1989, $32^{nd}$ Annual Polyurethane Technical/Marketing Conference.

J. Roser, et al., *"New Polyether Polyols Useful for the Production of Thermally Stable Elastomers"*, pp. 1–12, Oct. 28, 1997, Polyurethane Manufacturers Association.

DE 4236562, Derwent Abstract, Moisture–Hardening, One Component Polyurethane Binder–Comprising Mixt. Of di–and tri–functional polyether–polyol(s) and mixt. Of di phenylmethane di isocyanate isomers.., 1994.

EP 380088, Derwent Abstract, Expandable Sealants with Adjustable, Pref. Longer working time—Contg. Mixt. of short–chain poly ol (s) and poly–alcohol(s) with tert–amine(s) fillers fire retardant, etc., prepolymer and water, 1990.

Fig 1 Hardness retention / ageing at 155°C
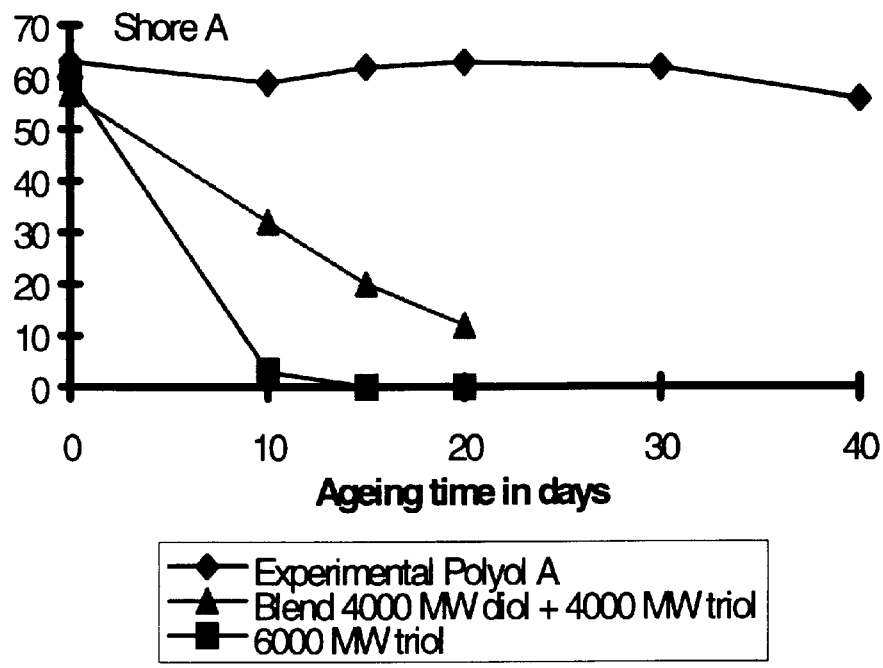
Fig 2 Tensile strength retention / ageing at 155°C
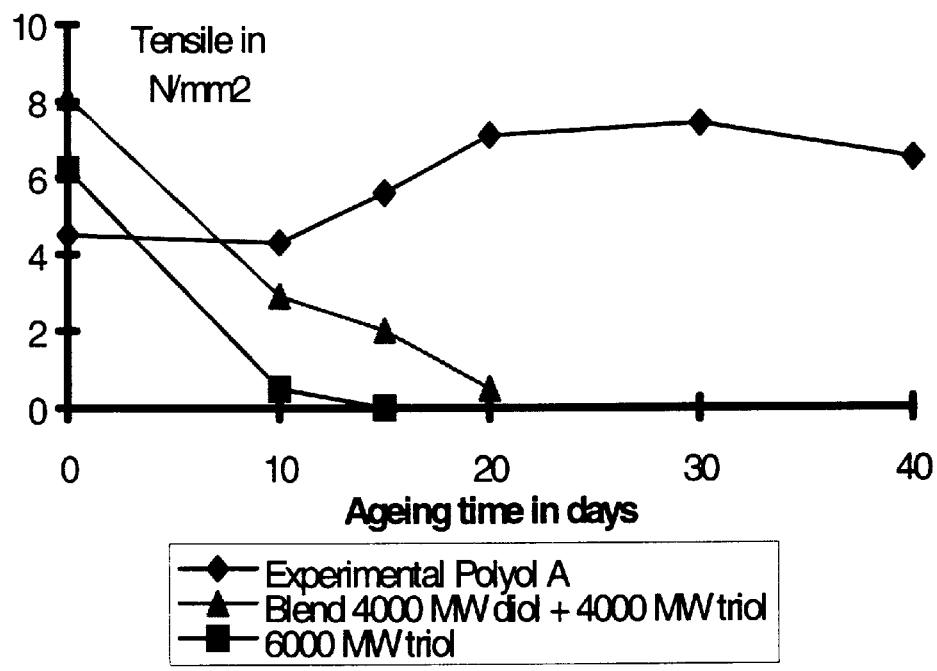

Fig 3 Retention of tensile strength under 140°C dry heat ageing test:
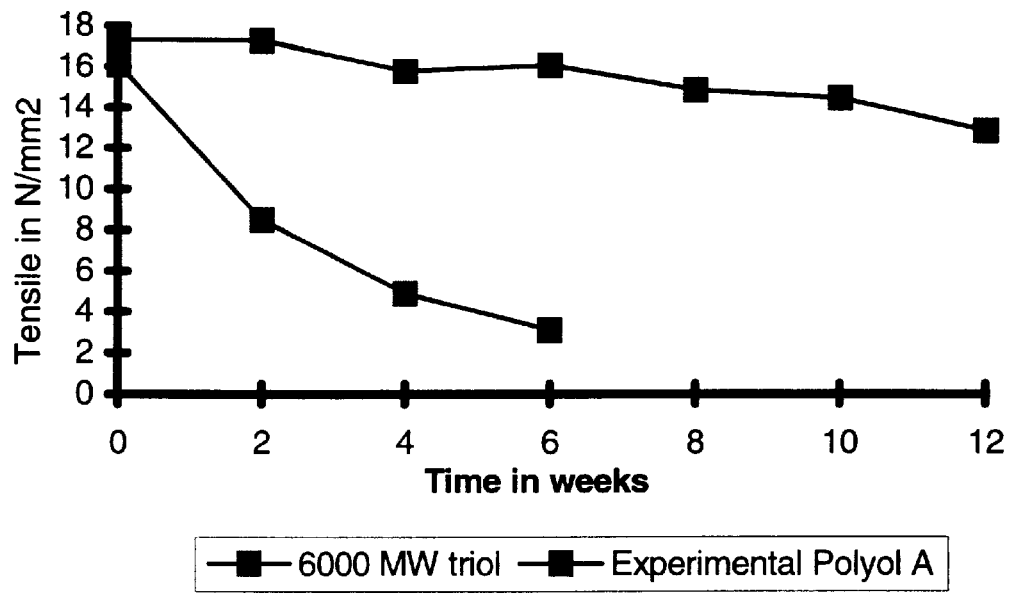
Fig 4 Retention of tensile elongation under 140°C dry heat ageing test:
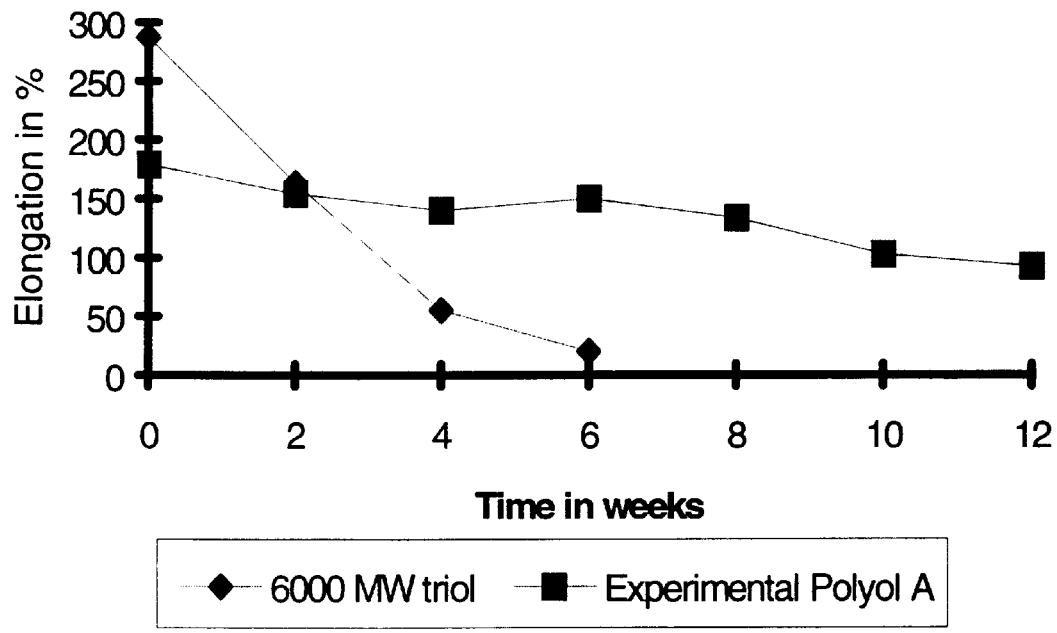

Fig 5 Impact of crosslinker level versus retention of tensile strength under 140°C dry heat ageing test:
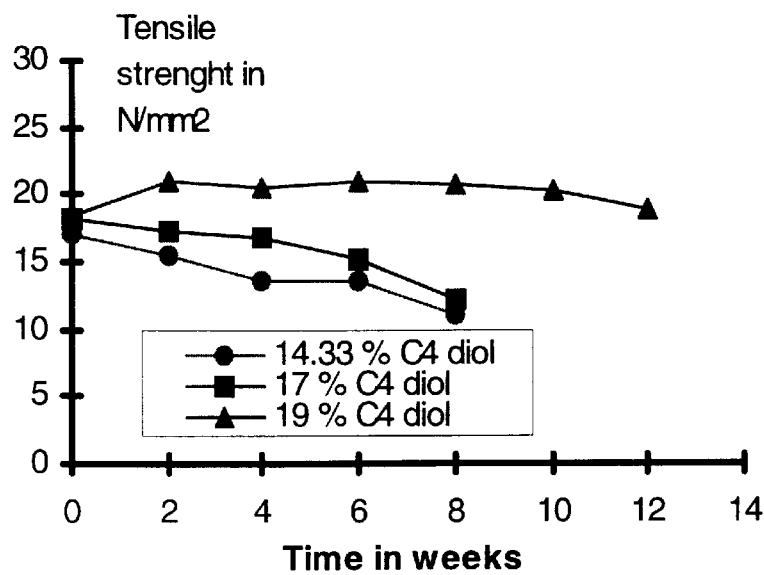
Fig 6 Influence of additional AO on tensile strength performance in shore A 90 elastomers.
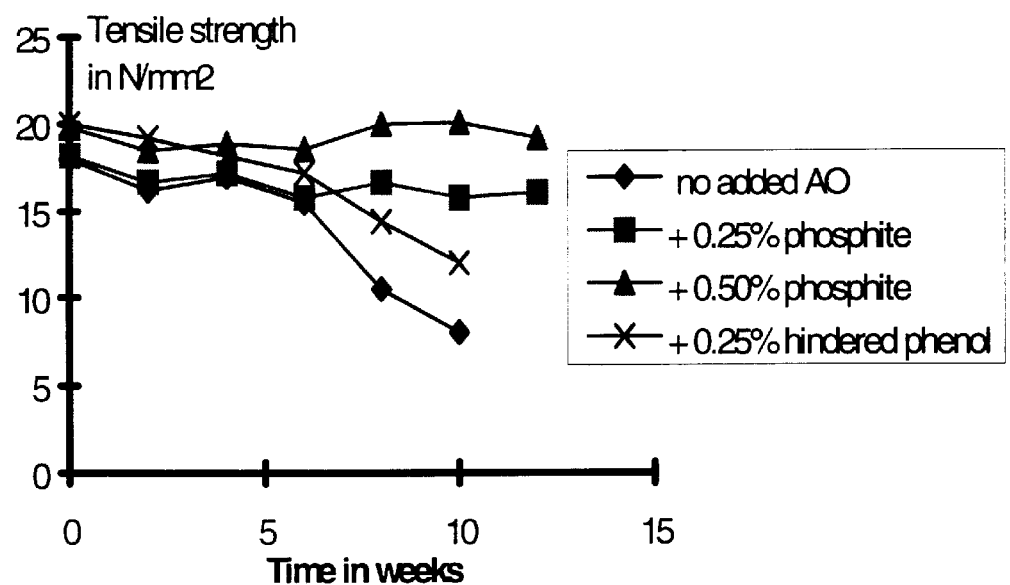

Fig. 7 Influence of additional AO on tensile elongation in shore A 90 elastomers
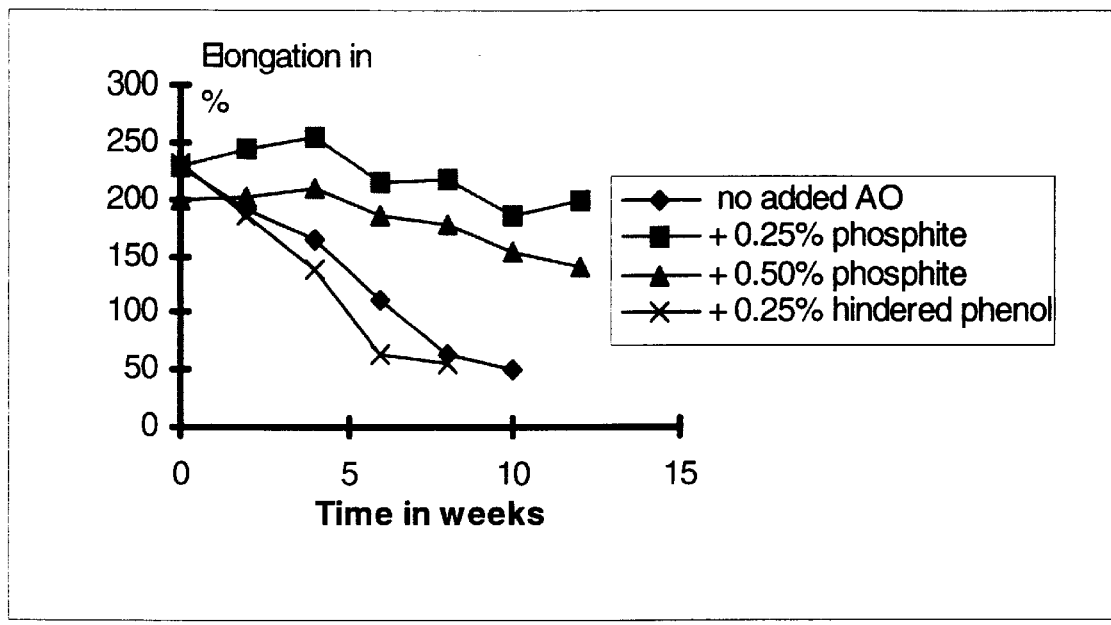
Fig 8 Impact of C4 diol content on Shore A. Elongation
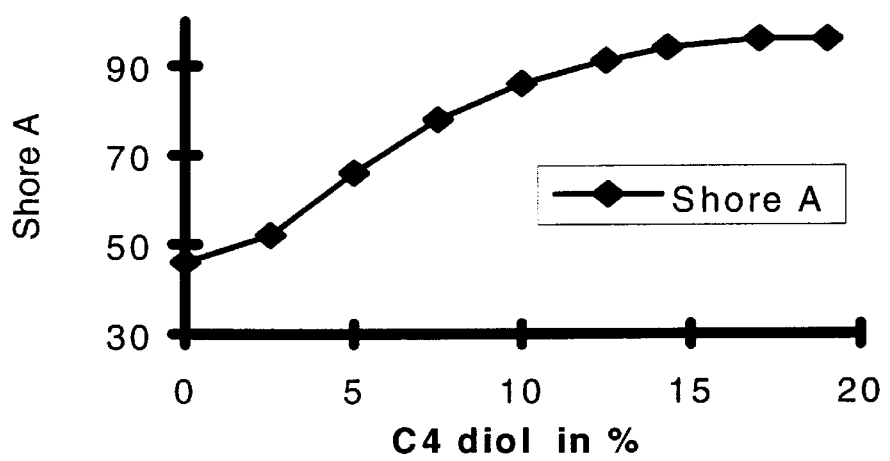

Fig 9 Impact of C4 diol content on
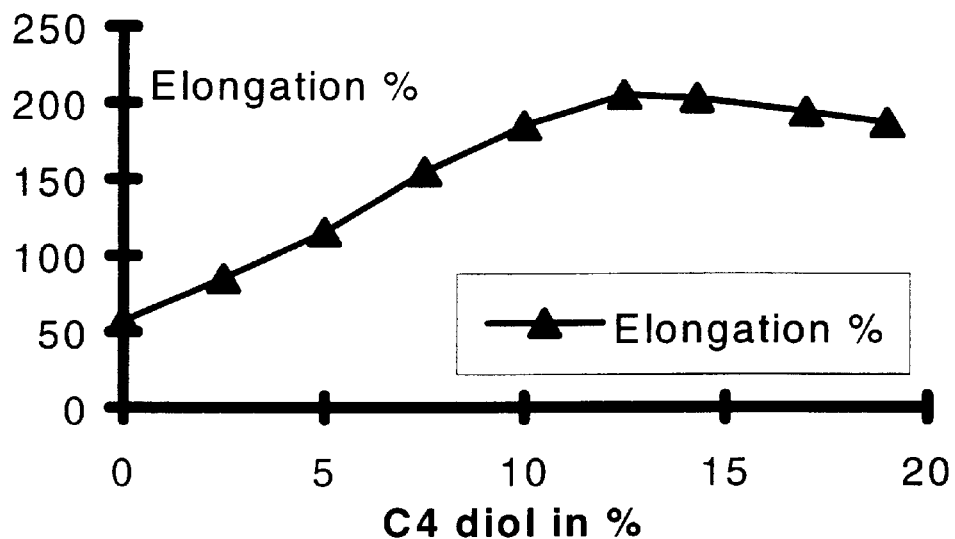
Fig 10 Variation of hardness / C8 diol content.
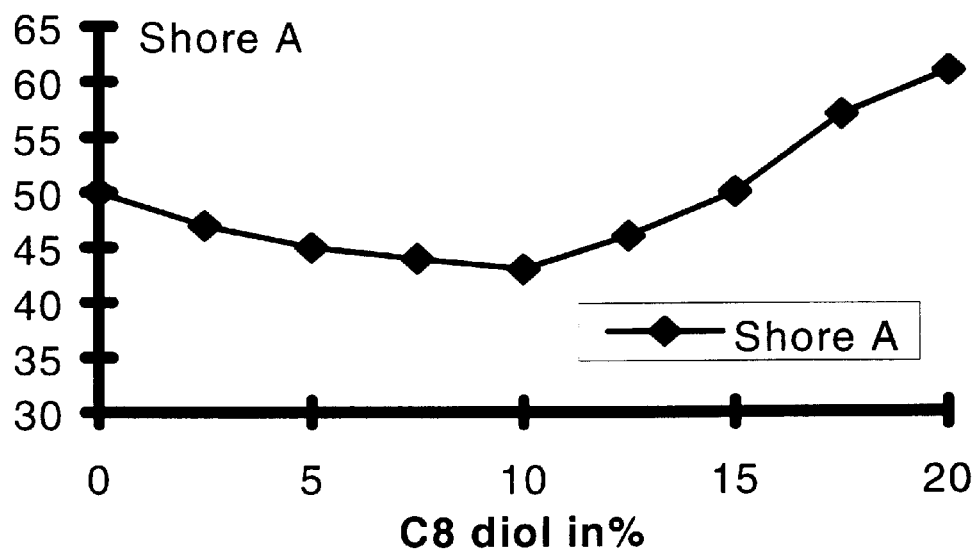

HIGH SERVICE TEMPERATURE POLYURETHANE COMPOSITIONS

CROSS REFERENCE STATEMENT

This application claims the benefit of U.S. Provisional application No. 60/059,948 filed on Sep. 26, 1997.

BACKGROUND OF INVENTION

This application relates to polyurethane compositions useful as adhesives, coatings, sealants and elastomers, especially cast polyurethane elastomers.

High service temperatures are required for many applications for polyurethane compositions. High service temperature is directly related to the thermal stability of the polyurethane, which is usually expressed in terms of the specific temperature, temperature ranges, or time-temperature limits, within which the polymer can be used without it experiencing significant degradation of key performance properties. It is known that conventional polyether based polyurethane compositions can withstand continuous use temperatures of about 100 to about 120° C. The use of polyurethane compositions in automotive applications, such as under the hood, and electrical encapsulation or bonding applications often require higher service temperatures of about 140 to about 155° C. As polyether based polyurethane compositions provide processing cost advantages over other polyurethanes it is desirable to have high service temperature polyether based polyurethane compositions. Such high service temperature applications include elastomers used in electrical castings, adhesives and coatings, encapsulants and gaskets.

Cast elastomers may be used for a wide variety of applications including tires and wheels, for example forklift tires, roller-skate and roller-blade wheels, running shoes, brake diaphragms, snowplow blades, grain buckets, drilling pipe thread protectors, grain and coal shoots, classifier shoes, hydraulic seals, wheel shocks, bowling ball cover stock, shaft couplers, sheet goods, rod stock, mining screens, conveyor belts, coated conveyor belts, gears, pipeline rigs, boat fenders, bump liners, helicopter blade sleeves, bumper pads, die cut pads (paper box industry), large rollers for steel and paper mills, copier rolls, encapsulated gate valves, encapsulated transponders (cattle tags), encapsulated concrete mixer blades, drive belts, dead blow hammers, sprockets, overrings, crane shock absorbers, sound dampening pads potting compounds and for coatings and encapsulated parts which are used in high heat environments, such as in the engine compartment of automobiles. Polyurethane cast elastomers are typically made by contacting the raw materials such as a polyisocyanate, a polyol, and often a chain extender in a mold coated with a mold release, and the contacted material is allowed to cure to form an elastomeric polyurethane piece.

Polyurethane rigid foam utilizing highly functional rigid polyols, have been disclosed as useful in the insulation of hot water/steam pipes for district heating, see Pots, et al., *Developments In Rigid Polyurethane Foams for Insulation of District Heating Pipes*, Polyurethanes World Congress, 1984. It is recognized that higher heat resistance is not normally obtained using conventional polyurethane chemistry except through the modification of the chemical structure by adding heterocyclic groups such as isocyanate, poly(urethane-oxylazolidone-isocyanate),or polyimide groups. See Frisch, et al., *New Heat Resistant Isocyanate Based Foams For Structural Applications*, Polyurethanes World Congress, 1991 and Frisch, et al., *Novel Heat Resistant Isocyanate Based Polymers*, 33$^{rd}$ Annual Polyurethane Technical Marketing Conference, Sep. 30–Oct. 3$^{rd}$ 1990. There are some limitations with this chemistry and soft elastomer products having such properties are difficult to obtain. The open literature has reported the development of heat resistance elastomers having been achieved through the use of specific cross-linkers, such as p,p' diphenol, quinol and hydroquinone di(beta-hydroxyl ethyl) ether (HQEE) and the like, see Frisch supra. It has also been reported that high heat resistant elastomers can be prepared from paraphenylene diisocyanate and naphthalene diisocyanate, Hepburn *Polyurethane Elastomer 2$^{nd}$ Edition*, 3:67, 1964 and Plummer, et al. *Paraphenylene Diisocyanate Based Thermoplastic Polyurethane Provide High Thermal Stability*, Polyurethanes Expo 1996. The high temperature elastomer systems described in such references exhibit the drawback of being solid or containing compounds solid at room temperature and therefore require processing above their melting points, usually above 100° C.

Conventional polyether based polyurethane elastomers can withstand continuous use temperatures of up to 100° C. to 120° C. European community legislative changes relating to vehicle pass by noise have reduced the allowed noise emission. This requires engine encapsulation and reduced air flow within the engine compartment resulting in higher working temperatures for all materials used in the engine compartment. Elastomers, gaskets and electrical encapsulating applications now require higher working temperatures, up to about 140° C. with a peak application temperature of up to about 155° C. Until now no heat resistance soft cast elastomers based on conventional polyether based polyurethane systems have been available.

What are needed are polyurethane formulations capable of forming polyurethanes which can be used in high temperature service environments and which do not degrade when exposed to temperatures of 120° C. or greater, preferably about 140° C. to about 155° C. and which formulations are easy to process at about ambient temperatures. In other words, formulations which are low in viscosity and easy to handle at low temperatures. What are also needed are high temperature resistant elastomers which can be prepared by casting techniques at or near ambient temperatures.

SUMMARY OF INVENTION

The invention is polyurethane compositions which upon cure are useful in high temperature service environments wherein the compositions comprise A) i) one or more polyols having hydroxyl functionality of 3.0 or greater and a weight average molecular weight of about 2000 to about 6000 wherein the polyols are the reaction product of one or more initiators having an average functionality of 4 or greater and one or more alkylene oxides; or
  ii) a) one or more polyols having hydroxyl functionality of 3.0 or greater and weight average molecular weight of about 4000 or greater wherein the polyols are the reaction product of one or more initiators having an average functionality of 4 or greater and one or ore alkylene oxides, and;
    b) one or more crosslinkers having an quivalent weight of about 200 or less;

B) one or more organic isocyanates; and

C) one or more catalysts for the reaction of an socyanate with an active hydrogen containing compound;

wherein the ratio of isocyanate moieties to active hydrogen containing moieties is about 0.9:1.0 to about 1.5:1.0.

In another embodiment the invention is a polyurethane elastomer prepared from the compositions of the invention.

In another embodiment the invention is adhesive and sealant compositions prepared from the polyurethane compositions of the invention.

In yet another embodiment the invention is a process for preparing a high temperature elastomer. The process comprises first contacting in a mold i) one or more low viscosity organic isocyanates and one or more polyols having hydroxyl functionality of about 3.0 or greater and a weight average molecular weight of about 2000 to about 6000 wherein the polyols are the reaction product of one or more initiators having an average functionality of about 4 or greater and one or more alkylene oxides; ii) one or more low viscosity organic isocyanates and one or more polyols having hydroxyl functionality of about 3.0 or greater and a weight average molecular weight of greater than about 6000 wherein the polyols are the reaction product of one or more initiators having an average functionality of about 4 or greater and one or more alkylene oxides and one or more a cross-linkers having an equivalent weight of about 200 or less; or iii) one or more isocyanate functional prepolymers prepared from one or more low viscosity organic isocyanates and one or more polyols having hydroxyl functionality of about 3.0 or greater and a weight average molecular weight of greater than about 6000 wherein the polyols are the reaction product of one or more initiators having an average functionality of about 4 or greater and one or more alkylene oxides with one or more cross-linker having an equivalent weight of about 200 or less. The process further comprises curing the contacted materials to form a solid polyurethane elastomer.

The formulations of the invention can be processed at relatively low temperatures to form high heat service temperature compositions useful as adhesives, sealants, encapsulants, gaskets and elastomers. Such formulations have relatively low viscosities at low and ambient temperatures. Further, the cured compositions of the invention demonstrate the ability to withstand temperatures of about 140° C. or greater and more preferably about 155° C. or greater without significant deterioration in properties. Elastomers of the invention can be used in electrical castings, encapsulating electrical device castings used in under the hood applications in automobiles and other environments where long term exposure to high heat environments is anticipated. The adhesives are especially useful in high heat environments.

DESCRIPTION OF FIGURES

FIG. 1 illustrates a comparison of the hardness retention of Shore A 60 elastomers of the invention to conventional elastomers.

FIG. 2 illustrates a comparison of the strength retention of Shore A 60 elastomers of the invention with conventional elastomers.

FIG. 3 illustrates a comparison of the tensile strength with ageing of Shore A 95 elastomers of the invention to conventional Shore A 95 elastomers.

FIG. 4 illustrates a comparison of the tensile elongation of Shore A 90 elastomers of the invention to conventional elastomers.

FIG. 5 illustrates the effect of the amount of $C_4$ diol on the tensile strength of the cast elastomer of the invention under ageing at 140° C. in dry heat.

FIG. 6 illustrates tensile strength performance of cast elastomers after ageing at various antioxidant levels.

FIG. 7 illustrates tensile elongation for Shore A 90 elastomers at various antioxidant levels after ageing at 140° C. in dry heat.

FIG. 8 illustrates the effect of 1,4 butane diol concentration on the Shore A properties of cast elastomers of the invention.

FIG. 9 illustrates the effect of 2-ethyl-1,3-hexanediol content on elongation of cast elastomers of the invention.

DETAILED DESCRIPTION OF INVENTION

In order to prepare high temperature resistant polyurethane elastomers at relatively low temperatures, the selection of certain polyols as the isocyanate reactive materials is important. In one embodiment the polyol is a polyether polyol having a weight average molecular weight of from about 2000 to about 6000 and a functionality of about 3.0 or greater. In this embodiment the resulting elastomers are fairly hard with low elongation. In another embodiment, the polyol is a polyether polyol having a weight average molecular weight of about 4000 or greater and more preferably about 6000 or greater and most preferably of about 8000 or greater. Preferably the polyether polyol has a weight average molecular weight of about 16,000 or less, more preferably about 14,000 or less, and even more preferably about 12,000 or less. In this second embodiment the polyols are used in conjunction with a cross-linking material as described hereinafter. In this embodiment the resulting elastomers are softer and have better elongation then the elastomers prepared from the polyols of the first embodiment described.

In order to achieve a polyether polyol having a functionality of about 3.0 or greater and more preferably about 3.2 or greater and which are capable of being handled at or near ambient temperatures, the choice of initiator is important. The initiators useful in this invention are initiators having a functionality of about 4 or greater and are preferably liquid. Among preferred initiators are sorbitol, a mixture of sucrose and glycerin, methyl glucoside, a hydrolyzed adducts of epoxy resin and a glycol, adducts of alkylene oxides and novolac resins, a mixture of sucrose and trimethyl propane, and blends of sucrose and ethylene diamine.

Preferably the polyols have a functionality of about 3.0 or greater, more preferably about 3.2 or greater and most preferably about 4.8 or less. Functionality as used with respect to Polyols is adjusted functionality taking into account the amount of unsaturation in the polyol. The adjusted functionality is calculated according to Formula 1

$$f = \frac{\left[\frac{OH}{56.1}\right]}{\left\{\left[\frac{OH}{56.1}\right] - unsat\right\}\left[\frac{1}{fn}\right] + unsat}$$

wherein OH is the hydroxyl number, milligrams of KOH/g; unsaturation is expressed in milliequivalents per gram and f is the nominal functionality which is the functionality of the initiator (for example a diol has a nominal functionality of 2. Alternatively, adjusted functionality can be adjusted according to formula 2.9 in Herrigton et al Dow Polyurethanes Flexible Foams, p 2.8, 2d edition 1997 (incorporated herein by reference).

The polyols preferably are prepared by the reaction of the initiator with an alkylene oxide. Such processes are well known to those skilled in the art. Such methods are described for example in U.S. Pat. Nos. 4,269,945; 4,218,543 and 4,374,210 which are hereby incorporated by reference in their entirety. Suitable alkylene oxides useful in this invention are described in U.S. Pat. No. 5,603,798 at column 4, lines 32 to 34 incorporated herein by reference. The preferred alkylene oxides include ethylene oxide, propylene oxide and butylene oxide with ethylene oxide and propylene oxide being most preferred. The cross-linkers utilized in this invention include any cross-linker which is known and which has an equivalent weight of about 200 or less. Cross-linkers as used herein refers to compounds which are also commonly referred to as chain extenders. Such cross-linkers are low molecular weight compounds having two active hydrogen atoms which react with isocyanate moieties. Preferred cross-linkers are $C_3$ to $C_{10}$ alkylene diols, $C_3$ to $C_{10}$ cycloalkylene diols, hydroquinone di(beta-hydroxyl ethyl)ether, ethoxylated bisphenol A, 4,4'-Methylene bis(2-chloroaniline), 4,4'-Methylenebis(3-chloro-2,6-diethylaniline), 3,5-dimethylthio-2,4-toluenediamine, 3,5-dimethylthio-2,6-toluenediamine, trimethylene glycol di-p-aminobenzoate and 1,4'bis(β-hydroxyethoxy)benzene. Examples of $C_3$–$C_{10}$ alkylene diols are 1,3-propanediol, 1,4-butanediol, 1,6-hexanediol, 2-ethyl-1,3-hexanediol, 2,2,4-trimethyl-1,3-pentanediol and 2-butyl-2-ethyl-1,3-propanediol. The cross-linking agents are present preferably in an amount of about 1 percent by weight or greater and more preferably about 5 percent by weight or greater based on the total weight of the formulation. Preferably the crosslinking agent is present in an amount of about 30 percent by weight or less based on the total weight of the total formulation, and more preferably about 15 percent or less.

Suitable polyisocyanates for use in preparing the elastomers include any aliphatic, cycloaliphatic, araliphatic; heterocyclic or aromatic polyisocyanate, or a mixture thereof. Preferably the polyisocyanates used have an average isocyanate functionality of at least about 2.0 and an equivalent weight of at least about 80. Preferably, the isocyanate functionality of the polyisocyanate is at least about 2.0, more preferably at least about 2.2, and is most preferably at least about 2.4; and is preferably no greater than about 4.0, more preferably no greater than about 3.5, and is most preferably no greater than about 3.0. Higher functionalities may also be used, but may cause excessive cross-linking, result in a formulation which is too viscous to handle and apply easily, and can cause the cured elastomer to be too brittle. Preferably, the equivalent weight of the polyisocyanate is at least about 100, more preferably at least about 110, and is most preferably at least about 120; and is preferably no greater than about 300, more preferably no greater than about 250, and is most preferably no greater than about 200. Examples of polyisocyanates useful in this invention are disclosed in Bhat U.S. Pat. No. 5,603,798 at Column 3 lines 14 to 60, relevant parts incorporated herein by reference. Preferably the isocyanate used is an aromatic isocyanate, an oligomerized aromatic isocyanate or a polymerized aromatic isocyanate and carbodiimide modified version of such isocyanates. More preferably the isocyanate is diphenyl methane diisocyanate, pure, in oligomerized or in polymerized form. Preferably the isocyanate is in the form of a liquid having a low viscosity, containing carbodiimides linkages and 2,4' isomers.

The ratio of isocyanate moieties to active hydrogen containing moieties in the formulation is preferably about 0.9 or greater more preferably about 1.0 or greater. Preferably, the ratio is about 1.5 or less, more preferably about 1.25 or less and most preferably about 1.1 or less. In one embodiment, where there is a large excess of isocyanate groups, the formulation may further contain a trimerization catalyst to encourage the formation of isocyanate moieties. This embodiment lowers the elasticity of the elastomer and improves the heat resistance. In such embodiment the isocyanate index is preferably from about 1.25 to about 2.0 and more preferably from about 1.25 to about 1.50.

The formulations of the invention include catalyst for the reaction of active hydrogen containing compounds with isocyanate moieties. Such catalysts are well known in the art and include the stannous salts of carboxylic acids, such as stannous octoate, stannous oleate, stannous acetate, and stannous laureate; dialkyltin dicarboxylates, such as dibutyl tin dilaurate and dibutyl tin diacetate; dibutyl tin sulfides; organomercurial catalysts, such as phenyl mercury ester of $C_{10}$ carboxylic acid; tertiary amines; hydroxyamines; titanates; potassium acetate; bismuth salts and tin mercaptides. The amount of catalyst employed depends on it's efficiency, the desired reaction profile, is preferably from about 0.005 to about 5 percent by weight of the composition, and more preferably from about 0.01 to about 2 percent by weight. Other known polyurethane catalysts include those disclosed in Taylor et al, U.S. Pat. No. 4,442,235 Column 7, lines 11 to 46, incorporated herein by reference. Preferred catalysts useful herein are tin mercaptides, dibutyl tin dicarboxylates, dibutyl tin sulfide, phenyl mercury ester of $C_{10}$ carboxylic acid, a dibutyltin dimaleate/ethylenediamine complex, dibutyltin dimaleate, dioctyltin dimercaptide, N-hydroxy-alkyl quatenary ammonium carboxylate, tris (dimethylaminomethyl), triethylene diamine and potassium acetate.

Other commonly used components in polyurethane elastomer formulations may be used in the formulations claimed herein. Such materials include fillers, such as hollow glass spheres; pigments; accelerators; flexibilizers; plasticizers; combustion modifiers; water scavengers and viscosity reduction agents. Preferably the compositions contain water scavengers such as zeolites. The amount of water scavengers preferably used in the formulations are preferably about 1.0 percent by weight of the formulation or greater, more preferably about 1.5 percent by weight or greater. Preferably the amount of water scavenger used is about 3.0 percent by weight of the formulation or less and more preferably about 2.0 percent by weight or less.

In another embodiment antioxidants are preferably used. Such antioxidants are well known in the art and include hindered phenols such as octadecyl 3,4-di-tertiarybutyl-4-hydroxydrocinnamate or butylated hydroxytoluene; phosphites, such as tris dipropyleneglycol phosphite; and aromatic amines, such as alkylated diphenyl amine. Preferably such antioxidants are used in an amount of about 0.01 percent by weight or greater based on the weight of the formulation, more preferably about 0.04 percent by weight or greater, even more preferably about 0.25 percent by weight or greater, and most preferably about 0.50 percent by weight or greater. Preferably the antioxidants are used in the amount of about 1.0 percent by weight or less. In one embodiment if a high level of antioxidant is used the thermal stability of the cured elastomers prepared from the formulations is improved. The preferred antioxidant package is a mixture of tris dipropyleneglycol phosphite and octadecyl 3,4-di-tertbutyl-4-hydroxydrocinnamate.

The polyurethane elastomers of this invention may be prepared by conventional one shot processes. In such processes, all of the reactants are combined and then poured into a mold or injected into a mold. The reactants then react to form a hardened mass. It is preferable to degas the reaction mixture or components prior to placing them in an appropriate mold. Typically the mold is coated with a mold release compound to allow removal of the hardened mass from the mold. Such mold release compounds are well known in the art. In another embodiment the formulations of the invention are contacted with a substrate to coat or encapsulate the substrate with or in the formulation and then the coated or encapsulated substrate is exposed to conditions such that the formulation cures. In the embodiment where a substrate is encapsulated, the substrate to be encapsulated is placed in a mold or box, held in place in a desired position, the formulation is introduced into the mold or box to surround the substrate and the formulation is exposed to curing conditions. Any substrate which can be protected by a polyurethane elastomer coating or encapsulant may be used. Examples of such substrates include plastics, metal, electrical devices, computer chips and the like. Preferred plastics include ABS rubbers, polyurethanes, polyamides, nylon, polyolefins and polycarbonates. Preferred metals include aluminum. The elastomers of the invention may be formed at temperatures of about 15° C. or greater, more preferably about 20° C. or greater and most preferably about 25° C. or greater. Preferably the elastomers are formed at a temperature of about 100° C. or less, more preferably about 40° C. or less. The elastomers of the invention are preferably formed at or near ambient temperatures.

After formation the elastomers of the invention may be subjected to curing conditions. Such curing conditions include curing at about 80° C. or greater for 1 hour or greater and may be subjected to post-curing at about 80° C. or greater and preferably about 100° C. or greater for about 12 hours or greater and preferably about 24 hours or greater.

In another embodiment the elastomers of the invention may be made by a prepolymer process in which some or all the polyols are prereacted with excess polyisocyanate to form a prepolymer. Thereafter, the prepolymer is reacted with the cross-linker to form the elastomer.

The elastomers of the invention can be used in high temperature environments. Preferably the elastomers of the invention can withstand temperatures of about 155° C. for about 10 days with no deterioration in properties. More preferably such elastomers can withstand about 12 weeks at about 140° C. without any deterioration in properties. Preferably such elastomers can last about 12 weeks at a temperature of about 100° C. in salt water with less than about 30 percent loss in properties. Preferably the elastomers of the invention having a Shore A of about 95 exhibit tensile strengths of about 8 $N/mm^2$ or greater, preferably about 12 $N/mm^2$ or greater and most preferably about 15 $N/mm^2$ or greater. Preferably such elastomers of the invention exhibit elongations of about 100 percent or greater and more preferably about 150 percent or greater.

At a Shore A of from about 50 to about 65 the tensile strength is preferably about 4 $N/mm^2$ or greater and most preferably about 5 $N/mm^2$ or greater, while the elongations are preferably about 200 percent or greater and more preferably about 250 percent or greater. Preferably the formulation is a liquid or a low viscosity blend. Suitable viscosities can vary according to the formulation and the ingredients (such as fillers). The polyols used in the process preferably have a viscosity of from about 1000 to about 2500 centipoise (cPs), the isocyanates used preferably have a viscosity of from about 30 to about 500 cPs. The blend of polyols with the isocyanates preferably have a viscosity of about 500 to about 2500 cPs at 25° C. without fillers.

In one embodiment the invention is an adhesive composition comprising the polyurethane compositions of the invention. More particularly the adhesive composition can comprise a polyurethane prepolymer as described herein which is formulated with a catalyst which promotes the curing of the prepolymer by atmospheric moisture. Useful catalysts are well known in the art and include dialkyltin dicarboxylate, dialkyltin dimercaptide, dimorpholinodiethyl ether, and (di(2-(3,5-dimethylmorpholino)ethyl)ether, etc. Other known polyurethane catalysts include those disclosed in Taylor et al, U.S. Pat. No. 4,442,235 Column 7, lines 11 to 46, incorporated herein by reference. The catalyst may be present in an amount of from about 0.01 to about 2.0 percent by weight with from about 0.05 to about 0.4 percent by weight being preferred. The preferred dialkyl tin dicarboxylates include 1,1-dimethyltin dilaurate, 1,1-dibutyltin diacetate, 1,1-dimethyl dimaleate and dibutyl tin sulfide. Where the catalyst is an organotin catalyst it is preferably present in an amount of about 5 parts per million or greater based on the weight of the adhesive, more preferably about 60 parts per million or greater and most preferably about 120 parts by million or greater. The organotin catalyst is preferably present in an amount of about 1.0 percent or less based on the weight of the adhesive, more preferably about 0.5 percent by weight or less and most preferably about 0.1 percent by weight or less. The one part adhesive may further comprise additional adhesive components well known in the art.

For formulating adhesive compositions, the prepolymer may be combined, with fillers, additives, ultraviolet stabilizers, and antioxidants known in the prior art for use in adhesive compositions. By the addition of such materials, physical properties such as viscosity, flow rate, sag, and fire resistance can be modified. However, to prevent premature reaction with the moisture sensitive groups of the polymer, the filler should be thoroughly dried before admixture therewith. Exemplary filler materials and additives include such as carbon black, titanium dioxide, clays, calcium carbonate, surface treated silicas, and PVC powder. This list, however, is not comprehensive and is merely illustrative. The fillers are preferably present in an amount of 1 percent by weight or greater based on the amount of the adhesive. The fillers are preferably present in an amount of about 300 percent by weight or less based on the adhesive, more preferably about 200 percent by weight or less and even more preferably about 150 percent by weight or less.

The adhesive composition may also contain one or more plasticizers or solvents to modify rheological properties to a desired consistency. Such materials should be free of water, inert to isocyanate groups, and compatible with the polymer. Such material may be added to the reaction mixtures for preparing the elastomer, or to the mixture for preparing the final adhesive composition, but is preferably added to the reaction mixtures for preparing the elastomer, so that such mixtures may be more easily mixed and handled. Suitable plasticizers and solvents are well-known in the art and include dioctyl phthalate, dibutyl phthalate, a partially hydrogenated terpene commercially available as "HB-40", trioctyl phosphate, trichloropropylphosphate, epoxy plasticizers, toluene-sulfamide, chloroparaffins, adipic acid esters, xylene, 1-methyl-2-pyrrolidinone and toluene. The amount of plasticizer used is that amount sufficient to give the desired rheological properties and disperse the components in the adhesive composition. Preferably the plasticizer is present in an amount of about 0 percent by weight or greater, more preferably about 5 percent by weight or greater and most preferably about 10 percent by weight or greater based on the adhesive composition. The plasticizer is preferably present in an amount of about 45 percent by weight or less, more preferably about 40 percent by weight or less and most preferably about 20 parts by weight or less based on the adhesive composition.

In another embodiment the adhesive, can be a two part composition in which one part comprises a low viscosity isocyanate as described before and the other part contains the polyols, and optionally the chain extender as described before. The two parts may be formulated with the other optional ingredients as described herein. The catalyst used may be a polyurethane curing catalyst as described herein, a catalyst for moisture curing as described herein, or a mixture thereof. The catalyst is preferably blended into the polyol part of the composition.

The adhesive compositions of this invention may be formulated by blending the components together using means well-known in the art. Generally the components are blended in a suitable mixer. Such blending is preferably conducted in an inert atmosphere and in the absence of atmospheric moisture to prevent premature reaction. It may be advantageous to add any plasticizers to the prepolymer so that such mixture may be easily mixed and handled. Alternatively, the plasticizers can be added during blending of all the components. Once the adhesive composition is formulated, it is packaged in a suitable container such that it is protected from atmospheric moisture. Contact with atmospheric moisture could result in premature crosslinking of the polyurethane prepolymer.

The adhesive compositions of the invention can be used to bond porous and nonporous substrates together. The adhesive composition is applied to a substrate and the adhesive on the first substrate is thereafter contacted with a second substrate. In the embodiment wherein the adhesive is a two part adhesive the two parts are combined prior to contacting with the substrate. Thereafter the adhesive is exposed to curing conditions. The substrates which may be adhered together include one or more of glass, plastic, metal, fiberglass or a composite substrate, such substrate may optionally be painted. Generally the one component adhesives of the invention are applied at ambient temperature in the presence of atmospheric moisture. Exposure to atmospheric moisture is sufficient to result in curing of the adhesive. Curing may be further accelerated by applying heat to the curing adhesive by means well known in the art including convection heating, or microwave heating.

SPECIFIC EMBODIMENTS

The following examples are provided to illustrate the invention, but are not intended to limit the scope thereof. All parts and percentages are by weight unless otherwise indicated.

Polyol A is a sorbitol initiated polyol having a molecular weight of about 12,000, a polyether chain of 85 percent propylene oxide units and 15 percent of ethylene oxide units and a hydroxyl functionality of 4.12.

Polyol B is a sucrose/glycerine (8 to 3 ratio) initiated polyol having a molecular weight of 8,000, a polyether chain of 90 percent propylene oxide units and 10 percent of ethylene oxide units and a hydroxyl functionality of 3.34.

Polyol C is a bisphenol adduct based on DER* 331 epoxy resin, and a monoethylene glycol initiated polyol having polypropylene oxide chain with a ethylene oxide cap (90/10 percent) having a molecular weight of 4000 and a functionality of 3.57.

Polyol D a sorbitol initiated polyol having a molecular weight of about 2,160, a polyether chain of propylene oxide units and a hydroxyl functionality of 4.5.

VORANOL* CP 6055 polyol is a 6000 MW polyether triol glycerine initiated with 14.5 percent of the polyether groups derived from ethylene oxide and 85.5 derived from propylene oxide.

VORANOL* CP 4702 polyol is a is 4800 MW glycerine initiated polyether triol with 17 percent of the polyether groups derived from ethylene oxide and 83 percent derived from propylene oxide.

VORANOL* EP 1900 polyol is 4000 MW polyether based reactive diol.

ISONATE* M340 Isocyanate is based on carbodiimide modified MMDI and MMDI prepolymer.

* DER, ISONATE and VORANOL are trademarks of The Dow Chemical Company.

Antioxidants used include sterically hindered phenols, phosphites and substituted aromatic amines.

A molecular sieve, 3A, is used as water a scavenger.
Preparation of formulated polyol:

The formulated polyol was prepared by mixing all necessary ingredients with a stirrer at least for 5 min. at 2000 rpm. The formulations contained a catalyst with the amount adjusted for a pot life of around 10 min. The blend was stored at ambient temperature. Re-homogenisation was carried out before use and further blending with the isocyanate component.

Preparation of cast elastomers:

A known quantity of the polyol blend (between 150 g to 200 g) was weighed into a plastic beaker and placed under vacuum until bubbles disappeared indicating that all dissolved gases were removed.

This process was repeated for the isocyanate. Both components were mixed together for at least two minutes using a wood spatula to avoid bubbles. The resulting mix was poured into another plastic beaker mixing was continued for 1 minute. The mixture was poured into a hot (80° C.), 2 mm spaced plate mould, with the surface adequately prepared with a water based release agent. The reaction was carried on by curing at 80° C. for about 1 H. The cast elastomer sheet was removed from the mould, post-cured for 24 hours at 100° C., and then stored for 7 days at 20° C., 65 percent relative humidity before testing.

Ageing Tests

All samples used for evaluation of mechanical properties, and evaluation of the retention of those properties under dry heat ageing, were cured and stored under the same conditions as described before.

In preparation for the dry heat ageing evaluations test bone pieces (DIN EN ISO 527; Shape #5) were cut out of the 2 mm thick elastomer sheet, placed on a Teflon tray and placed in an oven with temperature controlled within +/−3° C. of the set point.

Mechanical Properties

The following mechanical properties are tested using the listed tests: Tensile strength and Elongation DIN EN ISO 527 (Shape #5, speed 200 mm/min) The elongation is calculated by measuring the elongation between the jaws, DIN EN ISO 527, corrected by multiplication factor 0.66; Shore A and Shore D were performed according to DIN 53505. Tear strength were performed according to DIN 53515 without initial cut.

EXAMPLES 1, 2 AND COMPARATIVE EXAMPLES A AND B

Elastomers having a Shore A hardness of about 60 to about 65 were prepared from Polyol A (Example 1), Polyol B (Example 2) VORANOL CP 6055 polyol (Comparison Example A) and a mixture of VORANOL CP 4702 and VORANOL EP 1900 (Comparison Example B) using the procedure described above. The formulation used for Examples 1, 2 and Comparison A was 88.35 weight parts polyol, 5.0 weight parts 1,4-butane diol, 5.0 weight parts 2-ethyl, 1,3 hexane diol, 0.15 weight percent Formrez UL 32 Tin catalyst, 1.5 weight parts Molecular sieve 3A water scavenger, and 37.35 weight parts of Isonate M 340 isocyanate. The formulation for comparison Example B was the same except the polyol mixture comprised 58.96 weight parts of VORANOL CP 6055 polyol and 30.3 weight parts of VORANOL EP 1900 polyol, the amount of 1,4-butane diol was 9.09 weight parts, and the amount of Isonate M 340 isocyanate was 42.81 weight parts.

The prepared elastomers were aged at 155° C. for 0, 10, 15, 20, 30 and 40 days. The tensile elongation, tensile strength and Shore A hardness were tested at the designated aging times the results are compiled in Table 1.

TABLE 1

| Test | Example 1 | Example 2 | Comparative Example A | Comparative Example B |
|---|---|---|---|---|
| Retention of mechanical performances Ageing at 155° C. | | | | |
| Shore A | | | | |
| 0 day ageing | 63 | 67 | 60 | 57 |
| 10 days ageing | 59 | 57 | 3 | 32 |
| 15 days ageing | 62 | 56 | destroyed | 20 |
| 20 days ageing | 63 | 60 | | 12 |
| 30 days ageing | 62 | — | | — |
| 40 days ageing | 56 | | | |
| Tensile Elongation in % | | | | |
| 0 day ageing | 260 | 273 | 450 | 650 |
| 10 days ageing | 340 | 356 | 0 | 700 |
| 15 days ageing | 315 | 347 | | 720 |
| 20 days ageing | 295 | 280 | | 500 |
| 30 days ageing | 270 | — | | |
| 40 days ageing | 270 | | | |
| Tensile strength in N/mm$^2$ | | | | |
| 0 day ageing | 4.5 | 5.8 | 6.2 | 8.1 |
| 10 days ageing | 4.3 | 3.9 | 0.5 | 2.9 |
| 15 days ageing | 5.6 | 4.5 | | 2 |
| 20 days ageing | 7.1 | 6.5 | | 0.5 |
| 30 days ageing | 7.4 | — | | — |
| 40 days ageing | 6.5 | | | |

Major variations in Shore A performance are seen under ageing for the different formulations. The formulation based on Polyol A is stable whereas the formulation based on the comparative polyol were not stable. FIG. 1 shows the performance differences in hardness retention, and FIG. 2 illustrates performances differences in strength retention.

EXAMPLES 3 TO 6 AND COMPARATIVE EXAMPLE C

Shore A 95–97 elastomers prepared as described above were used under dry heat ageing conditions at 140° C. for up to ten weeks. The formulations and results are compiled in Table 2.

TABLE 2

| Ingredients | Example 3 Parts by WT | Example 4 Parts by WT | Example 5 Parts by WT | Example 6 Parts by WT | Comparative Example C Parts by WT |
|---|---|---|---|---|---|
| polyol A | 84.32 | | | 83.75 | |
| polyol B | | 84.53 | | | |
| polyol C | | | 84.02 | | |
| VORANOL CP 6055 | | | | | 84.53 |
| 1,4 butanediol | 14.33 | 14.37 | 14.28 | | 14.37 |
| 1,3 propanediol | | | | 14.3 | |
| Tin catalyst | | | 0.02 | | |
| Thorcat 534, mercury catalyst | 0.25 | 0.25 | — | 0.25 | 0.25 |
| Molecular sieve 3Å | 0.84 | 1.5 | 1.68 | 1.7 | 0.85 |
| Weston 430 Phosphite A.O. | 0.25 | | | | |
| Isonate M 340 | 60.56 | 61.69 | 63.86 | 70.34 | 60.11 |
| Retention of mechanical Properties Shore A | | | | | |
| 0 week ageing | 92 | | 93 | 97 | 94 |
| 2 weeks ageing | 94.5 | | 88 | 97.5 | 92 |
| 4 weeks ageing | 94 | | 87 | 97 | 90 |
| 6 weeks ageing | 93 | | 86 | 97 | 88 |
| 8 weeks ageing | 93 | | 87 | 97.5 | |
| 10 weeks ageing | 92.5 | | | | |
| Tensile Elongation % | | | | | |
| 0 week ageing | 229 | 168.4 | 200 | 217 | 287 |
| 2 weeks ageing | 245 | 231 | 204 | 234 | 173 |
| 4 weeks ageing | 255 | 217 | 184 | 237 | 55 |
| 6 weeks ageing | 216 | 228 | 147.8 | 238 | 20 |
| 8 weeks ageing | 217 | 195 | 106 | 235 | |
| 10 weeks ageing | 181 | 163 | 95 | 203 | |

TABLE 2-continued

| Ingredients | Example 3 Parts by WT | Example 4 Parts by WT | Example 5 Parts by WT | Example 6 Parts by WT | Comparative Example C Parts by WT |
|---|---|---|---|---|---|
| Tensile strength N/mm² | | | | | |
| 0 week ageing | 18.2 | 16.1 | 17.6 | 21.6 | 16.1 |
| 2 weeks ageing | 16.7 | 16.4 | 13.6 | 20.5 | 8.5 |
| 4 weeks ageing | 17.2 | 15.2 | 12.7 | 20 | 6.1 |
| 6 weeks ageing | 15.8 | 16 | 11.4 | 18.9 | 3.2 |
| 8 weeks ageing | 16.7 | 16.1 | 10.6 | 19.7 | — |
| 10 weeks ageing | 15.8 | 15.5 | 10.7 | 19.1 | |

FIG. 3 illustrates tensile strength performance, and FIG. 4 illustrates tensile elongation of Example 3 and Comparative Example C.

EXAMPLES 7 TO 9 AND COMPARATIVE EXAMPLES C AND D

Elastomers were prepared as described above using the formulations described in Table 3. Ageing tests were conducted on the formulations. Examples 7, 8, Comparative Examples C and D are aged at 140° C. and Example 9 is aged at 150° C. The results are compiled in Table 3.

TABLE 3

| Ingredients | Example 7 Parts by WT | Example 8 Parts by WT | Comparative Example C Parts by WT | Example D Parts by WT | "Shore A 98" Example 9 Parts by WT |
|---|---|---|---|---|---|
| polyol A | 80.85 | 79.35 | | | |
| polyol D | | | | | 98.2 |
| VORANOL CP 6055 | | | 84.53 | | |
| VORANOL EP 1900 | | | | 83.82 | |
| 1,4 butanediol | 17 | 19 | 14.37 | 14.25 | no |
| Formrez UL 32 at 2%, Tin catalyst | | 0.15 | | | 0.3 |
| Thorcat 534, mercury catalyst | 0.2 | | 0.25 | 0.25 | |
| Molecutar sieve 3Å, water scavenger | 1.7 | 1.5 | 0.85 | 1.68 | 1.5 |
| Weston 430 Phosphite A.O. | 0.5 | — | | | |
| Isonate M 340 | 70.33 | 78 | 60.11 | 60.05 | 45.84 |
| Retention of Mechanical Properties Tensile Elongation in % | | | | | |
| 0 week ageing | 229 | 147 | 287 | 517 | 120 |
| 2 weeks ageing | 245 | 157 | 173 | 70.5 | 112 |
| 4 weeks ageing | 255 | 153.6 | 55 | 51 | 96 |
| 6 weeks ageing | 216 | 117 | 20 | 35 | 92 |
| 8 weeks ageing | 217 | 111 | | destroyed | |
| Tensile strength in N/mm² | | | | | |
| 0 week ageing | 18.2 | 23.3 | 16.1 | 17.6 | 16.8 |
| 2 weeks ageing | 16.7 | 21.5 | 8.5 | 3.8 | 17.2 |
| 4 weeks ageing | 17.2 | 20.8 | 6.1 | 3.7 | 15.5 |
| 6 weeks ageing | 15.8 | 20.9 | 3.2 | 4.4 | 18.9 |
| 8 weeks ageing | 16.7 | 20.7 | — | — | |

Formulations having different levels of crosslinker were prepared and tested for ageing. (Example 3, 7, 8) The tests demonstrate that improved heat resistance may be obtained by using at least some quantities of crosslinker in the formulation, although Shore A and elongation are stable during ageing test at 140° C. FIG. 5 shows the impact of 1,4 butane diol ($C_4$diol) content on tensile strength in a cast elastomer under ageing at 140° C.

EXAMPLE 11

Elastomers based on Polyol A using the same formulation as in Example 3 with an antioxidant package of tris dipropyleneglycol phosphite and 500 ppm butylated hydroxytoluene, were prepared and tested for heat ageing.

The elastomers demonstrate good retention of physical properties over extended periods (12 weeks-140° C.). Additional heat ageing tests further demonstrated that the temperature-time limit, defined by 50 percent loss of mechanical performance, can be extended with antioxidants.

EXAMPLE 12

Samples of elastomers of the invention were prepared using phosphite and hindered phenol antioxidants. The tensile strengths and elastomers were examined in Shore A 90 elastomers. The data shows that "phosphite" based antioxidants when added at a minimum level of 0.25 percent on total elastomer formulation brings outstanding improvement. FIG. 6 illustrates tensile strength performance, and FIG. 7 illustrates tensile elongation for Shore A 90 elastomers under 140° C. dry heat ageing test.

EXAMPLES 13

Elastomers were prepared according to the procedures disclosed hereinbefore using polyol A with various amounts of 1,4 butane diol as the chain extender. The elastomers were tested for Shore A hardness, elongation, tensile strength and tear strength. The results are compiled in Table 4.

TABLE 4

|  | 13 | 14 | 15 | 16 | 17 | 18 | 19 | 20 | 21 |
|---|---|---|---|---|---|---|---|---|---|
| Experimental polyol A | 98.35 | 95.35 | 93.35 | 90.85 | 88.35 | 85.85 | 84.05 | 81.35 | 79.35 |
| C4 diol | 0 | 2.5 | 5 | 7.5 | 10 | 12.5 | 14.3 | 17 | 19 |
| Molecular sieve | 1.5 | 1.5 | 1.5 | 1.5 | 1.5 | 1.5 | 1.5 | 1.5 | 1.5 |
| Catalyst at 2% in polyol | 0.15 | 0.15 | 0.15 | 0.15 | 0.15 | 0.15 | 0.15 | 0.15 | 0.15 |
| Isocyanate I M-340 | 8.6 | 17.6 | 26.6 | 35.6 | 44.6 | 53.6 | 60.5 | 70.3 | 77.1 |
| Shore A | 46 | 52 | 66 | 78 | 86 | 91 | 94 | 96 | 96 |
| Elongation % | 57 | 85 | 115 | 155 | 185 | 205 | 203 | 195 | 187 |
| Tensile strength N/mm$^2$ | 0.7 | 1.3 | 2.9 | 6.3 | 10.0 | 13.8 | 17 | 19.8 | 20.6 |
| Tear strength N/cm | 12.5 | 31 | 56 | 98 | 163 | 216 | 459 | 525 | 617 |

FIG. 8 demonstrates the impact of 1,4 butane diol content on Shore A. FIG. 9 demonstrates the impact of 1,4 butane diol content on Elongation

What is claimed is:

1. Composition useful in preparing a polyurethane elastomer comprising
    A) i) one or more polyols having hydroxyl functionality of about 3.2 or greater and a weight average molecular weight of about 2000 to about 6000 wherein the polyols are the reaction product of one or more initiators having an average functionality of about 4 or greater and one or more alkylene oxides wherein the initiator is selected from the group consisting of sorbitol, a mixture of sucrose and glycerin, an adduct of an epoxy resin and a glycol, or an adduct of novolac resin and one or more alkylene oxides or a mixture thereof; or
    ii) a) one or more polyols having hydroxyl functionality of about 3.2 or greater and a weight average molecular weight of greater than about 6000 wherein the polyols are the reaction product of one or more initiators having an average functionality of about 4 or greater and one or more alkylene oxides wherein the initiator is selected from the group consisting of sorbitol, a mixture of sucrose and glycerin, an adduct of an epoxy resin and a glycol, or an adduct of novolac resin and one or more alkylene oxides or a mixture thereof; and
    b) one or more cross-linkers having an equivalent weight of about 200 or less;
    B) one or more organic isocyanates; and
    C) one or more catalysts for the reaction of isocyanate containing compounds with active hydrogen containing compounds;
       wherein the ratio of isocyanate moieties to active hydrogen containing moieties is from about 0.9:1.0 to about 1.5:1.0.

2. The composition of claim 1 wherein the ratio of isocyanate groups to active hydrogen containing groups is from about 1.0:1.0 to about 1.10:1.0.

3. The composition of claim 2 wherein the isocyanate is an aromatic isocyanate, an oligomerized aromatic isocyanate or a polymerized aromatic isocyanate derived from diphenyl methane diisocyante.

4. The composition of claim 3 wherein the functionality of the polyol is from about 3.2 to about 4.8.

5. The composition of claim 1 wherein the polyol has a molecular weight of greater than about 6000 and a cross-linker is present.

6. The composition of claim 5 wherein the cross-linker is a $C_3$–$C_{10}$ alkane or cycloalkane diol, hydroquinone di(beta-hydroxy ethyl) ether or alkoxylated bisphenol A or a mixture thereof.

7. The composition of claim 6 wherein the cross-linker is present in an amount of about 1 to about 30 percent by weight based on the total weight of the composition.

8. An elastomer comprising the reaction product of the composition according claim 1.

9. An elastomer of claim 8 wherein the ratio of isocyanate groups to active hydrogen containing groups is from about 0.9:1.0 to about 1.10:1.0.

10. An elastomer of claim 9 wherein the isocyanate is an aromatic isocyanate, an oligomerized aromatic isocyanate or a polymerized aromatic isocyanate.

11. An elastomer of claim 10 wherein the functionality of the polyol is from about 3.2 to about 4.8.

12. An elastomer of claim 8 wherein the polyol has a molecular weight of greater than about 6000 and at least one cross-linker is present.

13. An elastomer of claim 12 wherein the cross-linker is a $C_{3-10}$ alkane or cycloalkane diol, hydroquinone di (beta-hydroxyethyl) ether or alkoxylated bisphenol A.

14. A process for preparing a high temperature elastomer according to claim 1 which comprises contacting in a mold a) i) one or more low viscosity organic isocyanates and one or more polyols having hydroxyl functionality of 3.2 or greater and a weight average molecular weight of about 2000 to about 6000 wherein the polyols are the reaction product of one or more initiators having an average functionality of about 4 or greater and one or more alkylene oxides wherein the initiator is selected from the group consisting of sorbitol, a mixture of sucrose and glycerin, an adduct of an epoxy resin and a glycol, or an adduct of novolac resin and one or more alkylene oxides or a mixture thereof; ii) one or more low viscosity organic isocyanates and one or more polyols having hydroxyl functionality of about 3.2 or greater and a weight average molecular weight of greater than about 6000 wherein the polyols are the reaction product of one or more initiators having an average functionality of about 4 or greater and one or more alkylene oxides wherein the initiator is selected from the group consisting of sorbitol a mixture of sucrose and glycerin, an adduct of an epoxy resin and a glycol, or an adduct of novolac resin and one or more alkylene oxides or a mixture thereof, and one or more cross-linkers having an equivalent weight of about 200 or less; or iii) one or more isocyanate functional prepolymers prepared from one or more low viscosity organic isocyanates and one or more polyols having hydroxyl functionality of about 3.2 or greater and a weight average molecular weight of greater than about 6000 wherein the polyols are the reaction product of one or more initiators having an average functionality of about 4 or greater and one or more alkylene oxides wherein the initiator is selected from the group consisting of sorbitol, a mixture of sucrose and glycerin, an adduct of an epoxy resin and a glycol, or an adduct of novolac resin and one or more alkylene oxides or a mixture thereof, with one or more cross-linkers having an equivalent weight of about 200 or less; wherein the ratio of isocyanate groups to active hydrogen containing groups is from about 0.9:1.0 to about 1.5:1.0; and, b) curing the contacted materials to form a solid polyurethane elastomer.

15. An adhesive or sealant composition comprising a polyurethane composition according to claim 1.

16. A method of bonding two substrates together comprising contacting an adhesive composition according to claim 15 with two substrates and exposing the adhesive to conditions such that cures and bonds the two substrates together.

17. A process for encapsulating a substrate comprising
    a) placing the substrate in a mold;
    b) filling the mold with a composition according to claim 1; and
    c) exposing the composition to curing conditions.

18. A process for coating a substrate which comprises
    a) contacting a substrate with a composition according to claim 1;
    b) curing the composition.

19. The composition of claim 1 wherein the average functionality of the initiators is greater than 4.0.

20. Composition useful in preparing a polyurethane elastomer comprising

A) i) one or more polyols having hydroxyl functionality of about 3.2 or greater and a weight average molecular weight of about 2000 to about 6000 wherein the polyols are the reaction product of one or more initiators having an average functionality of about 4 or greater and one or more alkylene oxides wherein the initiator is selected from the group consisting of sorbitol, a mixture of sucrose and glycerin, an adduct of an epoxy resin and a glycol, or an adduct of novolac resin and one or more alkylene oxides or a mixture thereof; or ii) a) one or more polyols having hydroxyl functionality of about 3.2 or greater and a weight average molecular weight of greater than about 6000 wherein the polyols are the reaction product of one or more initiators having an average functionality of about 4 or greater and one or more alkylene oxides wherein the initiator is selected from the group consisting of sorbitol, a mixture of sucrose and glycerin, an adduct of an epoxy resin and a glycol, or an adduct of novolac resin and one or more alkylene oxides or a mixture thereof; and b) one or more cross-linkers having an equivalent weight of about 200 or less;

B) one or more organic isocyanates;

C) one or more catalysts for the reaction of isocyanate containing compounds with active hydrogen containing compounds; and D) a phosphite based antioxidant; wherein the ratio of isocyanate moieties to active hydrogen containing moieties is from about 0.9:1.0 to about 1.5:1.0.

* * * * *